United States Patent [19]

Verhelst

[11] Patent Number: 5,314,928
[45] Date of Patent: May 24, 1994

[54] METHOD FOR PREPARING POLYUREA - POLYURETHANE FLEXIBLE FOAMS

[75] Inventor: Gabriel Verhelst, Herent, Belgium

[73] Assignee: Imperial Chemical Industries PLC, London, England

[21] Appl. No.: 774,442

[22] Filed: Oct. 10, 1991

[30] Foreign Application Priority Data

Oct. 12, 1990 [GB] United Kingdom ............... 9022194

[51] Int. Cl.⁵ ................................................ C08J 9/08
[52] U.S. Cl. .................................... 521/159; 521/163; 521/164; 521/166; 521/167
[58] Field of Search ............... 521/159, 163, 164, 166, 521/167; 528/53, 85

[56] References Cited

U.S. PATENT DOCUMENTS

| | | |
|---|---|---|
| 2,995,530 | 8/1961 | Frisch et al. ................ 521/159 |
| 3,149,083 | 9/1964 | Gmitter ......................... 521/159 |
| 3,285,879 | 11/1966 | Larson et al. ................ 521/159 |
| 3,297,597 | 1/1967 | Edwards et al. ............. 521/166 |
| 3,654,370 | 4/1972 | Yeakey ........................... 564/480 |
| 3,752,790 | 8/1973 | McShane, Jr. et al. ...... 521/159 |
| 3,816,360 | 6/1974 | Taub .............................. 528/76 |
| 3,817,940 | 6/1974 | Blahak et al. ................. 521/159 |
| 3,890,254 | 6/1975 | Guthrie ......................... 521/159 |
| 3,903,232 | 9/1975 | Wood et al. .................... 521/159 |
| 3,905,923 | 9/1975 | Klug .............................. 521/159 |
| 3,939,105 | 2/1976 | Jones, Jr. et al. ............. 521/159 |
| 3,939,123 | 2/1976 | Matthews ...................... 521/159 |
| 3,991,023 | 11/1976 | Blahak et al. ................. 521/159 |
| 4,048,106 | 9/1977 | Hermans ........................ 521/159 |
| 4,049,632 | 9/1977 | Magnusson et al. ......... 528/59 |
| 4,171,390 | 10/1979 | Hilterhaus et al. .......... 521/159 |
| 4,181,770 | 1/1980 | Schuhmacher et al. ..... 521/159 |
| 4,220,732 | 9/1980 | McBrayer ...................... 521/167 |
| 4,234,693 | 11/1980 | Wooler ........................... 521/107 |
| 4,282,330 | 8/1981 | Austin ............................ 521/118 |
| 4,297,444 | 10/1981 | Gilbert et al. ................. 521/160 |
| 4,324,867 | 4/1982 | Patton, Jr. et al. ........... 521/159 |
| 4,371,629 | 2/1983 | Austin ............................ 521/164 |
| 4,383,102 | 5/1983 | McDaniel et al. ............ 528/96 |
| 4,525,488 | 6/1985 | Cuscurida et al. ........... 521/164 |
| 4,526,905 | 7/1985 | Lucast et al. ................. 521/159 |
| 4,608,397 | 8/1986 | Reischl ......................... 521/101 |
| 4,668,708 | 5/1987 | Mueller et al. ............... 521/159 |
| 4,794,129 | 12/1988 | Gillis, Jr. et al. ............. 521/121 |
| 4,797,427 | 1/1989 | Sanders et al. ............... 521/159 |
| 4,883,826 | 11/1989 | Marugg et al. ............... 521/164 |
| 4,945,120 | 7/1990 | Kopp et al. ................... 521/163 |
| 5,034,426 | 7/1991 | Casey et al. .................. 528/85 |
| 5,034,427 | 7/1991 | Frigo et al. ................... 521/163 |
| 5,049,591 | 9/1991 | Hayashi et al. .............. 521/159 |
| 5,064,875 | 11/1991 | Grögler et al. ............... 521/159 |
| 5,070,114 | 12/1991 | Watts et al. ................... 521/159 |

FOREIGN PATENT DOCUMENTS

| | | |
|---|---|---|
| 0005903 | 12/1979 | European Pat. Off. . |
| 0116758 | 8/1984 | European Pat. Off. . |
| 0351852 | 1/1990 | European Pat. Off. . |
| 0379184 | 7/1990 | European Pat. Off. . |
| 0392788 | 10/1990 | European Pat. Off. . |
| 237177 | 7/1986 | Fed. Rep. of Germany . |
| 1534551 | 7/1968 | France . |
| 2187836 | 1/1974 | France . |
| 128714/76 | 5/1978 | Japan . |
| 874430 | 8/1961 | United Kingdom . |
| 1207183 | 9/1970 | United Kingdom . |
| 2041387 | 9/1980 | United Kingdom . |
| 2084595 | 4/1982 | United Kingdom . |

*Primary Examiner*—John Kight, III
*Assistant Examiner*—Rabin Sergent

[57] ABSTRACT

A method for preparing a polyurethane/polyurea flexible foam which comprises reacting:

A. an organic prepolymer-containing polyisocyanate composition of NCO content of from 2 to 15% by weight;

B. an isocyanate reactive component in which the isocyanate-reactive species comprises at least 40% by weight of water and at least one chain extender of molecular weight below 1000 which is selected from those having at least two amine groups of which at least one is directly attached to a cyclic hydrocarbon residue and from diamino polyols.

5 Claims, No Drawings

METHOD FOR PREPARING POLYUREA - POLYURETHANE FLEXIBLE FOAMS

The invention relates to the manufacture of polyurethane/polyurea flexible foams.

The manufacture of polyurethane/polyurea flexible foams is well known in the art and methods for their preparation have been fully described in the literature.

It is known to manufacture flexible polyurethane foams by reacting isocyanates with isocyanate-reactive compositions containing high molecular weight compounds, in the presence of blowing agents.

It is also known to include in the isocyanate-reactive composition a chain extender, such as 1,4-butanediol, alone or in admixture with phenyldiethanolamine or aromatic polyamines.

Thus GB 2041387 describes the manufacture of microcellular flexible PU foams by reacting isocyanate with a high molecular weight polyether polyol and a mixture of 1,4-butanediol and phenyldiethanolamine, the amount of those low molecular weight compounds ranging from 0.2% to 40% by weight of polyether polyol.

The use of relatively high amounts of aromatic diamines as chain extenders for free rise or sprayed polyurethane/polyurea foams has also been disclosed, in EP 177766.

It is also known from EP-A-392788 to manufacture flexible polyurethane/polyurea foams by reacting isocyanate with a high molecular weight isocyanate reactive compound and reduced amounts of chain extenders.

It has now been found that flexible polyurethane/polyurea foams, having improved mechanical properties and reduced densities, can be obtained by reacting an isocyanate prepolymer composition of low NCO content with water and a specific chain extender.

According to this invention water is substantially the sole blowing agent. The corresponding foam formulations contain no significant amount of chlorofluorocarbons such as trichlorofluoromethane which are deemed detrimental to the environment.

Thus according to the present invention there is provided a method for preparing polyurethane/polyurea flexible foams which comprises reacting:

A. an organic prepolymer-containing polyisocyanate composition of NCO content of from 2 to 15% by weight;

B. an isocyanate reactive component in which the isocyanate-reactive species comprises at least 40% by weight of water and at least one chain extender of molecular weight below 1000 which is selected from those having at least two amine groups of which at least one is directly attached to a cyclic hydrocarbon residue and from diamino polyols.

The molar ratio of isocyanate to water ranges preferably from 3:1 to 1:8 and the molar ratio of isocyanate to chain extender ranges preferably from 1:1 to 500:1. Preferably the amount of chain extender in the isocyanate-reactive composition ranges from 2 to 20% by weight calculated on the whole isocyanate-reactive composition.

The isocyanate reactive component may contain optionally reduced amounts of another chain extender and of high MW isocyanate-reactive compound and catalyst with further conventional additives.

According to a preferred method, 100 parts by weight of the polyisocyanate component (A) is reacted with 1 to 10 parts by weight of the isocyanate-reactive component.

The organic polyisocyanate prepolymer composition (A) of the invention has an average isocyanate functionality greater than 2 and a NCO content of from 2 to 15% by weight, preferably 2 to 12% by weight as obtainable by reacting an isocyanate reactive polymer having an average nominal functionality of from 2 to 6, preferably from 2 to 4, and an average equivalent weight of from 500 to 5000 with a stoichiometric excess of a diphenylmethane diisocyanate composition having an average isocyanate functionality in the range from 2 to 2.3.

The term "nominal hydroxyl functionality" used in relation to the isocyanate reactive polymer on which the prepolymer is based refers to the hydroxyl functionality that an isocyanate reactive polymer such as a polyol would be expected to have having regard to its monomeric components.

For example, a polyether polyol prepared by the addition of propylene oxide to a glycol will have a nominal hydroxyl functionality of 2 although, in fact, its average functionality may be somewhat less than 2. Thus for a polyether polyol, the average nominal functionality is the average functionality (number of active hydrogen atoms) of the initiator or initiators used in its preparation.

More narrowly, the present invention provides a method of manufacture of flexible foams using, in conjunction with water and a chain extender, a stable liquid isocyanate containing polyurethane prepolymer composition having an average isocyanate functionality greater than 2 and a NCO content of from 2 to 15% by weight obtained by reacting:

(i) a polyol component comprising at least one polyoxyalkylene polyol containing oxyethylene residues, said polyol component having an average nominal functionality of from 2 to 6, an average hydroxyl equivalent weight of from about 500 to about 5000 and an average oxyethylene content in the isocyanate reactive polyoxyalkylene polymer in the range from 5 to 50%, preferably from 5 to 25%, on a weight basis of total oxyalkylene residues and, (ii) a stoichiometric excess, relative to the polyol component, of a diphenyl diisocyanate composition.

A suitable diisocyanate composition is a diphenylmethane diisocyanate (MDI) composition containing at least 2% by weight of 2,4'-diphenylmethane diisocyanate on a weight basis of diisocyanate components, and having an average isocyanate functionality in the range from 2 to 2.3.

More specifically, there is used a stable liquid isocyanate-containing prepolymer composition as obtainable by reacting an isocyanate reactive polyoxyalkylene polymer with a diphenylmethane diisocyanate containing composition, characterised by an average isocyanate functionality of the prepolymer composition greater than 2, preferably in the range from 2.05 to 2.4;

an -NCO content of the prepolymer composition of from 2 to 15% by weight, preferably of from 5 to 12% by weight;

an oxyethylene content in the isocyanate reactive polyoxyalkylene polymer in the range from 5 to 50% on a weight basis of total oxyalkylene residues;

an average nominal functionality of the isocyanate reactive polyoxyalkylene polymer of from 2 to 6;

a total diphenylmethane diisocyanate content in the MDI-containing composition of at least 60% by weight;

a 2,4' MDI isomer content in the MDI-containing composition of at least 5%;

an average isocyanate functionality of the MDI-containing composition of from 2 to 2.3, preferably of from 2.1 to 2.3.

Suitable high molecular weight isocyanate-reactive compounds used for the preparation of the prepolymer have molecular weights of 1000-10000, preferably 1000-7000.

Their functionality should range from 2 to 6, preferably from 2 to 4.

Typical high molecular weight isocyanate-reactive compounds include polyether polyols, polyester polyols, polyamines, imino-functional compounds and mixtures thereof.

Particularly important isocyanate-reactive polymers include polymeric polyols. Suitable polymeric polyols and methods for their preparation have been fully described in the prior art and, as examples of such polyols, there may be mentioned polyesters, polyesteramides, polythioethers, polycarbonates, polyacetals, polyolefins, polysiloxanes and especially, polyethers.

Polyether polyols which may be used include products obtained by the polymerisation of a cyclic oxide, for example ethylene oxide, propylene oxide, butylene oxide or tetrahydrofuran in the presence, when necessary, of polyfunctional initiators.

Suitable initiator compounds contain a plurality of active hydrogen atoms and include water and polyols, for example ethylene glycol, propylene glycol, diethylene glycol, cyclohexane dimethanol, resorcinol, bisphenol-A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxide to di- or trifunctional initiators as fully described in the prior art. Preferably the amount of oxyethylene is 5 to 50% and more preferably 5 to 25% by weight. Mixtures of the said diols and triols can be particularly useful. Other particularly useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols. Other polyols which may be used comprise dispersions or solutions of addition or condensation polymers in polyols of the types described above. Such modified polyols often referred to as "polymer" polyols have been fully described in the prior art and include products obtained by the in situ polymerisation of one or more vinyl monomers, for example styrene and acrylonitrile, in polymeric polyols, for example polyether polyols, or by the in-situ reaction between a polyisocyanate and an amino- or hydroxy-functional compound, such as triethanolamine, in a polymeric polyol.

The polymer modified polyols which are particularly interesting for preparing isocyanate-containing prepolymers in accordance with the invention are products obtained by the in situ polymerisation of styrene and/or acrylonitrile in poly(oxyethylene/oxypropylene) polyols having functionalities of 2–4, equivalent weights of 750–3000 and ethylene oxide contents of 5–50%, preferably 5–25% on a weight basis of total oxyalkylene residues, and products obtained by the in situ reaction between a polyisocyanate and an amino- or hydroxy-functional compound (such as triethanolamine) in a (poly-(oxyethylene/oxypropylene) polyol having a functionality of 2–4, an equivalent weight of 750–3000 and an ethylene oxide content of 5–50%, preferably 5–25% on a weight basis of total oxyalkylene residues.

Polyoxyalkylene polyols containing from 5 to 50% of dispersed polymer are particularly useful. Particles sizes of the dispersed polymer of less than 50 microns are preferred.

Other useful isocyanate-reactive polymers for preparing the prepolymers include polymeric polyamines, especially diamines and triamines, corresponding to the above described polymeric polyols. Suitable polyamines of polyether polyols are described for example in U.S. Pat. No. 3,654,370 or may be obtained by the cyanoethylation of polyols followed by hydrogenation. Polyoxypropylene diamines and triamines and mixtures thereof are preferred. Also useful are polymers containing both amino and hydroxyl groups obtained by the partial amination of polyol.

Further isocyanate-reactive polymers which may be used in preparing the prepolymers include imino-functional and enamine-functional polymers. Such polymers have been described in U.S. Pat. No. 4,794,129 together with methods for their preparation.

Diphenylmethane diisocyanate compositions which may be used in the preparation of the prepolymer include unmodified diphenylmethane diisocyanates containing at least 2% by weight of the 2,4'-isomer and preferably containing at least 60% by weight of the 4,4'-isomer. Suitable isocyanates therefore include isomer mixtures containing at least 2% but not more than 30% by weight of the 2,4' isomer. Other suitable diphenylmethane diphenylmethane diisocyanates, that is to say MDI modified in known manner by the introduction of urethane, allophanate, urea, biuret, carbodiimide, uretonimine or isocyanurate residues These so-called MDI variants particularly include uretonimine-modified MDI having NCO contents of at least 25% by weight and polyether-based prepolymers having NCO contents of at least 20% by weight.

Diphenylmethane diisocyanate compositions containing MDI and polymeric fillers may also be used in the preparation of the prepolymer. Such products include polyurea dispersions in MDI such as have been described, for example, in EP-A-0103996. Other compositions containing polymeric fillers include prepolymers based on MDI and the above mentioned "polymer" polyols containing dispersed polymer particles. In these products, it is generally preferred that the dispersed polymer particles have an average particles size of less than 50 microns.

Further diphenylmethane diisocyanate compositions which may be used in the preparation of the prepolymers include compositions containing polymethylene polyphenylene polyisocyanates. Thus mixtures may be used containing at least 50% by weight of the so-called polymeric MDI containing from 35 to 65% by weight of diisocyanates, the remainder being largely polymethylene polyphenylene polyisocyanates having isocyanate functionalities greater than 2. Mixtures may also be used of pure MDI and polymeric MDI compositions containing higher functionality polyisocyanates.

Still further diphenylmethane diisocyanate compositions which may be used in preparing the prepolymer include mixtures of the above described MDI types and up to 20% by weight of another polyisocyanate or mixture of polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexyl methane diisocyanates and m- or p-tetramethylxylene diisocyanates and, especially, aromatic polyisocyanates such as tolylene diisocyanates, phenylene diisocyanates and MDI compositions.

Any of the above mentioned diphenylmethane diisocyanate compositions, or any mixture thereof, may be used in the preparation of the prepolymer provided that the overall 2,4'-MDI content is at least 2% by weight and provided also that the overall isocyanate functionality is in the range 2 to 2.3.

The isocyanate-terminated prepolymer may be prepared by reacting the diphenylmethane diisocyanate composition with the isocyanate-reactive polymer under conditions that have been fully described in the prior art for the preparation of prepolymers. Reaction temperatures of about 40° C. to about 100° C. are generally suitable for the preparation of urethane group-containing prepolymers from polyols or urea group-containing prepolymers from polyamines but, if desired, the reaction may be continued under known conditions so as to convert urethane groups to allophanate groups and urea groups to biuret groups. To achieve a final NCO content within the specified range, an initial ratio of isocyanate to isocyanate-reactive groups (for example NCO/OH) would typically be within the range from 3:1 to 20:1. Preferred prepolymers are made by reacting the starting materials at an initial ratio of isocyanate to isocyanate-reactive groups in the range from 3.5:1 to 15:1, especially 4:1 to 10:1.

The isocyanate-terminated prepolymer compositions according to the invention may further be blended with other polyisocyanate compositions, in particular further diphenylmethane diisocyanate compositions as mentioned for the preparation of the isocyanate-terminated prepolymer compositions or other polyisocyanates as described before. Such blends also constitute isocyanate-terminated prepolymer compositions which may be used in the method according to the invention.

In order to prepare a prepolymer having an average isocyanate functionality greater than 2, it is necessary to use a reaction mixture containing at least one prepolymer precursor having a functionality greater than 2, said precursors being selected from the polyols and diphenylmethane diisocyanate compositions defined above or to increase the functionality of the prepolymer by converting a proportion of urethane groups to allophanate groups.

The selection of reaction components and/or reaction conditions capable of providing a prepolymer of the invention having an average isocyanate functionality greater than 2 will present no difficulty to a person skilled in the art.

The prepolymer compositions of the invention are particularly interesting to incorporate therein solid particulate materials such as fillers and/or more particularly solid flame retardants.

The most suitable prepolymer compositions of the invention for this particular purpose are those compositions which result from using polyols containing dispersed polymer particles (as described above) and/or diphenylmethane diisocyanate compositions containing dispersed polyurea particles, as described above. The invention thus provides a liquid isocyanate-containing prepolymer composition having an NCO content of from 2 to 15% by weight (preferably of from 5 to 12% by weight), and an average isocyanate functionality greater than 2, which composition comprises from 5 to 50% by weight of dispersed polymer and 5 to 100 parts by weight of isocyanate-containing prepolymer composition.

Particularly interesting flame retardant agents include melamine, aluminium hydrates, magnesium hydroxide, graphite and various phosphorous and/or halogen containing compounds described in Polyurethanes Handbook band VII (Carlhauser Verlag).

The prepolymer compositions used in the method of the invention are liquid compositions having low vapour pressures. They may be used in the manufacture of flexible foams having high resilience combined with excellent tear and tensile properties.

To effect foam formation, the isocyanate-terminated prepolymer is reacted with water and one or more chain extenders in the presence as necessary of conventional additives. Such additives include catalysts, for example tertiary amines and tin compounds, surface-active agents and foam stabilisers, for example siloxane-oxyalkylene copolymers, flame retardants, organic and inorganic fillers, pigments and internal mould release agents. Moulded or slabstock foam may be prepared from the prepolymers using continuous or discontinuous production techniques.

The chain extenders are selected from those having a MW below 1000, preferably in the range of 60 to below 1000 and at least 2 amine groups of which at least one is directly attached to a cyclic hydrocarbon residue and from diamino polyols having a molecular weight below 1000.

Suitable chain extenders are aliphatic and cycloaliphatic amines as isophorone diamine (1-amino-3-amino-3,5,5-trimethyl cyclohexane),' fully hydrogenated di(aminophenyl)methane, piperazine, hydrogenated methylene dianiline, diamino menthane, and hydrogenated toluene diamine; and aromatic diamines as diethyl toluene diamine (DETDA) and derivatives of 4,4'-diphenylmethane diamine like the corresponding N,N'-di-alkyl (1-6 C) derivatives e.g. the N,N' di-t-butyl derivative and diamino polyols like Mannich derivatives of phenols or alkyl phenols, particularly Mannich condensates of phenol or phenol derivatives, formaldehyde and an alkanolamine, e.g. diethanolamine.

It has been found that the latter class of low MW polyol derivatives provide foams with excellent structure and less skin peeling than observed with conventional agents.

A most preferred Mannich derivative is 2,6 bis (N,N-diethanolamine)- 4-nonylphenol.

Other useful amino polyols in the method of the invention are propylene oxide or ethylene oxide adducts of the above mentioned Mannich condensates, such adducts being of MW below 1000.

The invention is illustrated by the following examples.

Ingredients used:
1. Polyol A : glycerol initiated polyoxypropylene/polyoxyethylene polyol of nominal functionality 3, of OH value 32 with 15% ethylene oxide tipping.
2. Polyisocyanate A : pure 4,4'-methyl diphenyl diisocyanate modified by Polyol A to a NCO content of 6.3% (weight ratio 25/75); further blended by addition of a polymeric MDI commercialised by Imperial Chemical Industries PLC under the tradename Suprasec DNR polyisocyanate, to provide a composition containing 5% of Suprasec DNR polyisocyanate. Suprasec is a trademark of Imperial Chemical Industries PLC.
3. Polyisocyanate B : a composition consisting of isomers of diphenylmethane diisocyanates (20% 2,4':80% 4,4') modified by addition of Polyol A to a NCO content of 6.7 (weight ratio 25:75).
4. Polyisocyanate C : pure 4,4'-diphenylmethane diisocyanate modified by Polyol A to a NCO content of 6.7 (weight ratio 25/75); further blended to provide a composition containing 10% of Suprasec DNR.
5. Polyisocyanate D : polyisocyanate as obtained by reacting Polyol A with 4,4'-diphenylmethyl diisocyanates containing 10% of 2,4' isomer, at a weight ratio of 25/75.

EXAMPLE 1

175 parts by weight (pbw) of polyisocyanate A was reacted with a composition comprising H₂O (6.0 pbw), Niax Al (1) (0.1 pbw), Dabco 33LV (2) (2.0 pbw), IPDA (3) (0.5 pbw), and DELA (4) (0.5 pbw). A good quality flexible foam was obtained having a density of 52 Kg/m³. A foam prepared in the same way but in the absence of IPDA and DELA showed inside split.

(1) a amine catalyst supplied by Union Carbide,
(2) a 33% solution of triethylene diamine in dipropylene glycol marketed by Air Products Inc.,
(3) isophorone diamine,
(4) diethanolamine.

EXAMPLE 2

A flexible foam was prepared from 215 pbw of Polyisocyanate B and a composition comprising Dabco 33LV (2.0 pbw), Niax Al (0.1 pbw), H₂O (6.0 pbw), and IPDA (0.5 pbw).

The quality of the foam was good and the density was 68 Kg/m³ while a preparation in the same way but in the absence of IPDA gave a powder and no structure.

EXAMPLE 3

A foam was prepared from Polyisocyanate C (153.3 pbw) and a composition comprising H₂O (6.0 pbw), Dabco 33LV (0.25 pbw), Niax A1 (0.25 pbw), DETDA (diethyl toluene diamine) (0.5 pbw), and DELA (0.25 pbw). The foam had a good quality, did not show split and had a density of 44 Kg/m³.

EXAMPLE 4

Three foams were prepared from Polyisocyanate D (100 pbw) and a composition comprising H₂O (3.11 pbw), Dabco 33LV (0.8 pbw), Niax A1 (0.1 pbw), and 2,6-bis (N,N-diethanolamine)-4-nonylphenol (0; 0.5 and 1.0 pbw respectively).

The foam made without the chain extender showed split while the other foams did not.

EXAMPLE 5

A foam was prepared from Polyisocyanate D (100 pbw) and a composition comprising H₂O (3.11 pbw), DETDA (0.7 pbw) and Dabco 33LV (1.2 pbw).

The foam had a foam density of 60 kg/m³, a hardness 40% of 115 N (ISO 2439), a tear strength of 400 N/m (ISO 8067), a tensile strength of 140 kPa (ISO 1798) and an elongation of 300% (ISO 1798).

I claim:

1. A method for preparing a polyurethane/polyurea flexible foam which comprises reacting:
   A. an organic prepolymer-containing polyisocyanate composition of NCO content of from 2 to 15% by weight obtained by reacting an isocyanate-reactive polymer having an average nominal functionality of from 2 to 6 and an average equivalent weight of from 500 to 5000 with a stoichiometric excess of a diphenylmethane diisocyanate composition having an average isocyanate functionality in the range from 2 to 2.3; and
   B. an isocyanate reactive component in which the isocyanate-reactive species comprises at least 40% by weight of water and at least one chain extender of molecular weight below 1000 which is selected from the group consisting of a Mannich condensate of phenol or phenol derivatives, formaldehyde and alkanolamines, isophorone diamine, hydrogenated methylene dianiline, diaminomenthane, hydrogenated toluene diamine, diethyl toluene diamine and N,N'-dialkyl(1-6C)-4,4'-diphenylmethane diamine; wherein the molar ratio of said isocyanate to water is from 3:1 to 1:8 and the molar ratio of said isocyanate to said chain extender is from 1:1 to 500:1.

2. A method according to claim 1 wherein the chain extender is 2,6-bis(N,N-diethanolamine-4-nonylphenol.

3. A method according to any one of the preceeding claims wherein the prepolymer-containing polyisocyanate composition has been prepared from a polyether polyol having a functionality of 2 to 4 and a molecular weight of 100 to 7000.

4. A method according to claim 1 wherein the polyisocyanate is a stable liquid isocyanate-containing prepolymer composition as obtained by reacting an isocyanate reactive polyoxyalkylene polymer with a diphenylmethane diisocyanate containing composition characterised by an average isocyanate functionality of the prepolymer composition greater than 2;

an -NCO content of the prepolymer composition of from 2 to 15% by weight;

an average oxyethylene content in the isocyanate reactive polyoxy-alkylene polymer in the range from 5 to 50% on a weight basis of total oxyalkylene residues;

an average nominal functionality of the isocyanate reactive polyoxyalkylene polymer of from 2 to 6;

a total diphenylmethane diisocyanate content in the MDI-containing composition of at least 60% by weight;

a 2,4' MDI isomer content in the MDI-containing composition of at least 5%;

an average isocyanate functionality of the MDI-containing composition of from 2 to 2.3.

5. A reaction system for preparing a polyurethane/polyurea flexible foam comprising:

A. an organic prepolymer-containing polyisocyanate composition of NCO content of from 2 to 15% by weight obtained by reacting an isocyanate-reactive polymer having an average nominal functionality of from 2 to 6 and an average equivalent weight of from 500 to 5000 with a stoichiometric excess of a diphenylmethane diisocyanate composition having an average isocyanate functionality in the range from 2 to 2.3; and B. an isocyanate reactive component in which the isocyanate-reactive species comprises at least 40% by weight of water and at least one chain extender of molecular weight below 1000 which is selected from the group consisting of a Mannich condensate of phenol or phenol derivatives, formaldehyde and alkanolamines, isophorone diamine, hydrogenated methylene dianiline, diamino-menthane, hydrogenated toluene diamine, diethyl toluene diamine and N,N'-dialkyl(1-6C)-4,4'-diphenylmethane diamine; wherein the molar ratio of said isocyanate to water is from 3:1 to 1:8 and the molar ratio of said isocyanate to said chain extender is from 1:1 to 500:1.

* * * * *